June 19, 1928.

E. H. CARROLL 1,673,799

MANUFACTURE OF GEARS

Filed Dec. 22, 1923

Inventor:-
Elbert H. Carroll
By Atty:- Owen W. Kennedy

June 19, 1928.

E. H. CARROLL 1,673,799

MANUFACTURE OF GEARS

Filed Dec. 22, 1923   6 Sheets-Sheet 5

Inventor:
Elbert H. Carroll.
By Atty. Owen W. Kennedy

June 19, 1928.  1,673,799
E. H. CARROLL
MANUFACTURE OF GEARS
Filed Dec. 22, 1923   6 Sheets-Sheet 6

Fig.8

Inventor:
Elbert H. Carroll
By attorney
Geo. H. Kennedy Jr.

Patented June 19, 1928.

1,673,799

UNITED STATES PATENT OFFICE.

ELBERT H. CARROLL, OF WEST BOYLSTON, MASSACHUSETTS, ASSIGNOR TO MORGAN CONSTRUCTION COMPANY, OF WORCESTER, MASSACHUSETTS, A CORPORATION OF MASSACHUSETTS.

MANUFACTURE OF GEARS.

Application filed December 22, 1923. Serial No. 682,201.

My invention relates to the manufacture of gears, and has for its object to provide an improved method and a machine for cutting bevel gear teeth, each of the faces of which has the form of a portion of a conical spiral of constant pitch.

By my invention I provide an improved method whereby gear teeth, formed as described above, may be planed on a conical gear blank by a reciprocating cutting tool, cooperating with means for simultaneously rotating the gear blank. In carrying out my method I provide an improved machine employing a reciprocating cutting tool which is always adapted to move in a straight line, passing through the center or apex of the conical surface of the gear blank on which the teeth are formed. Consequently, rotative movement of the blank simultaneously with the reciprocatory movement of the cutting tool, results in the formation of gear teeth, each of the faces of which has the form of a portion of a conical spiral of constant pitch, inasmuch as the path of the cutting tool is always along a conical surface. Other advantageous features of my invention will hereinafter more fully appear, reference being had to the accompanying drawings in which Fig. 1 is a plan view of a gear cutting machine for carrying out my invention.

Like reference characters refer to like parts in the different figures.

Figure 1:
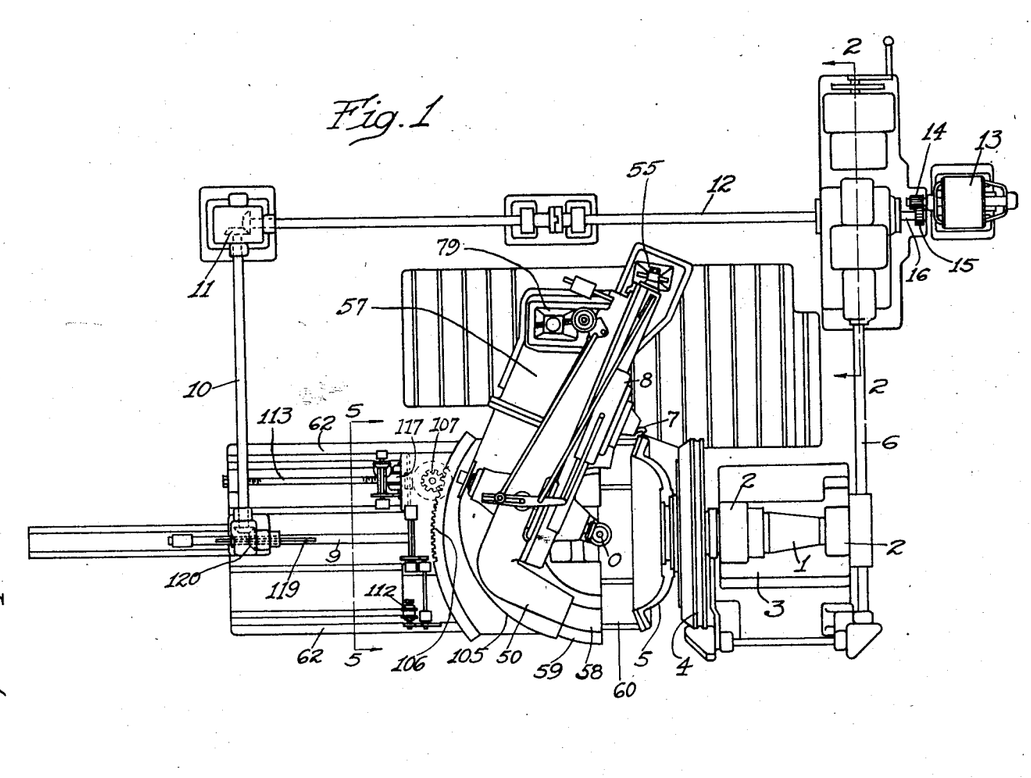

Referring to Fig. 1, a work support or mandrel 1 is rotatably mounted in bearings 2 extending upwardly from a base plate 3, and is provided at one end with a carrier 4 for supporting a gear blank 5. A work actuating shaft 6 is adapted to impart rotative movement to the gear blank 5 by its operative connection, either to the mandrel 1 or to the carrier 4, the particular arrangement for rotating the gear blank 5 forming no part of the present invention, but being fully shown and described in the United States Letters Patent of Jerome R. George, No. 1,518,060, dated December 2, 1924.

A cutting tool 7, mounted on a tool slide 8, is adapted to be moved back and forth in a straight line with respect to the face of the gear blank 5, by mechanism which will be more fully described. It is sufficient to say at this point in the description of my invention, that the cutting edge of the tool 7 is always moved along a line passing through the point 0, which is the center or apex of the conical surface of the gear blank 5. Reciprocatory movement is imparted to the tool slide 8 in the manner hereinafter described, from a tool actuating shaft 9 which is connected by means of a cross shaft 10 and bevel gearing 11, to a shaft 12 that extends toward the operating means for the work actuating shaft 6.

Figure 2:
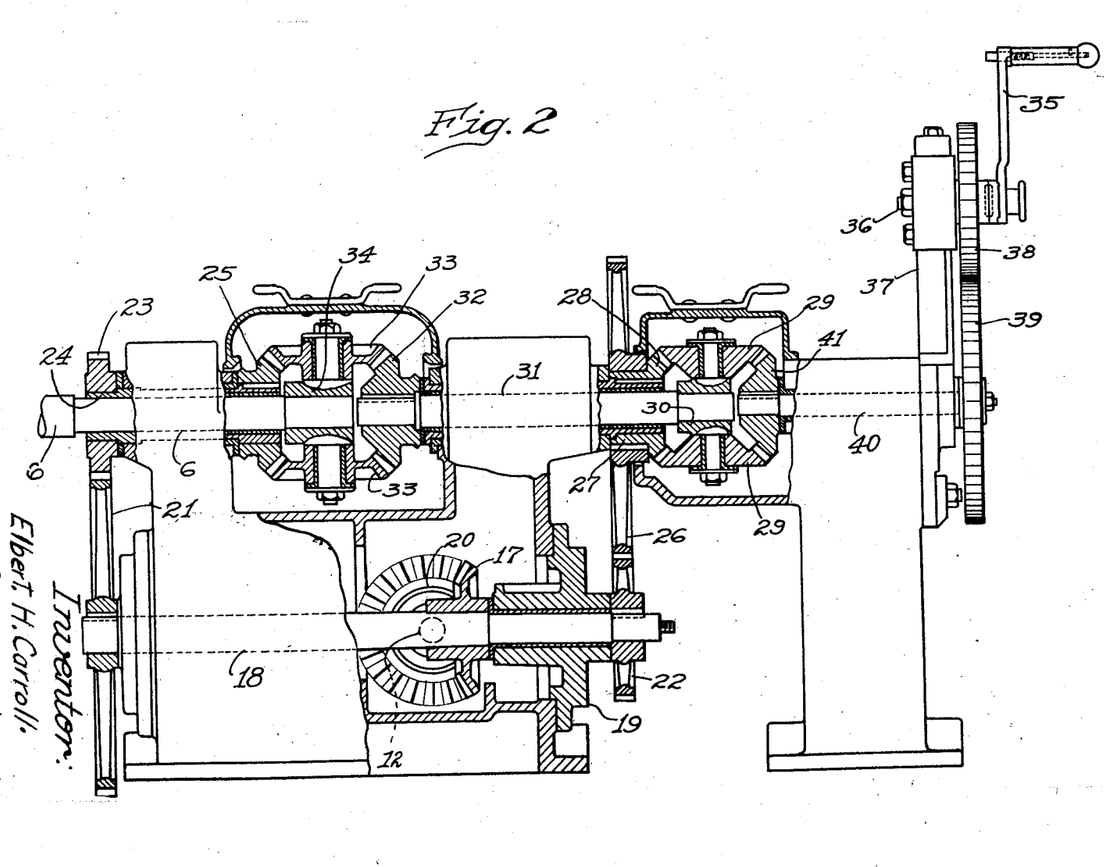
Fig. 2 is a larger scale view, partially in vertical section, along the line 2—2 of Fig. 1.
Figure 8:
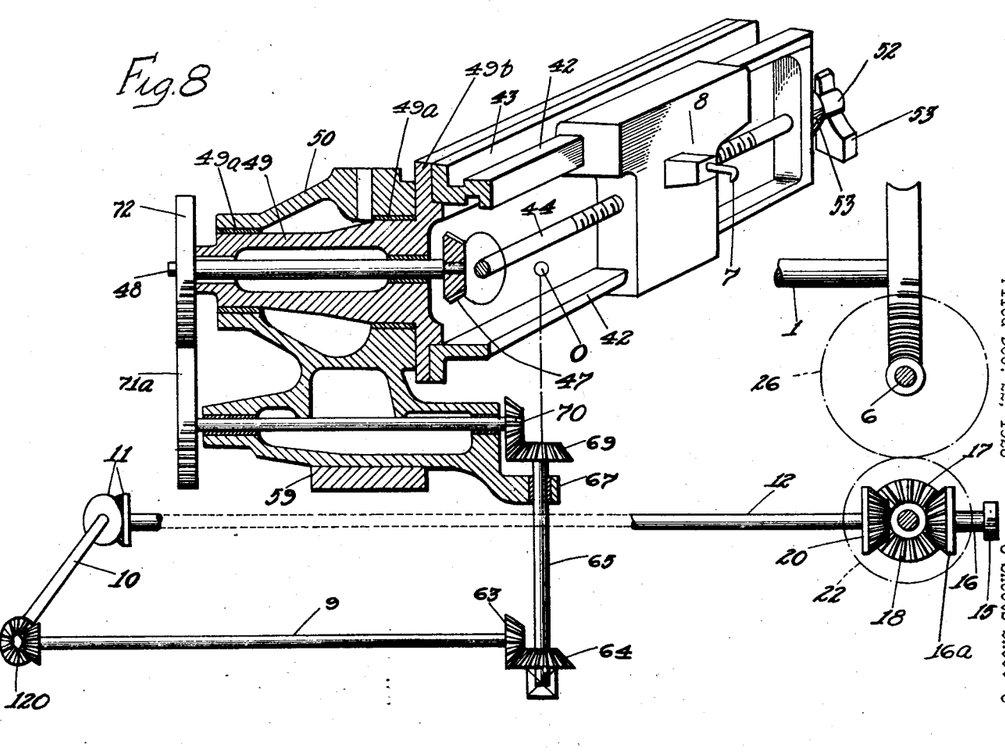
Fig. 8 is a perspective view, partly in section, showing the pivotal mounting of the tool arm and also showing a schematic layout of the gearing relations of the machine.

An electric motor 13 is connected through reduction gears 14 and 15 to a shaft 16 which is adapted to drive the shafts 6 and 9 in unison. As best shown in Fig. 8, the shaft 16 is connected by a bevel gear 16$^a$ to a bevel gear 17 mounted on a countershaft 18, which is supported by a bearing 19, Fig. 2. The gear 17 is in mesh with a gear 20 keyed on the shaft 12, so that the shaft 12 is driven in unison with the countershaft 18, by the shaft 16. Gears 21 and 22 are mounted on the shaft 18 and the gear 21 is in mesh with a gear 23 mounted on a sleeve 24 surrounding the shaft 6, which sleeve is provided at its opposite end with a bevel gear 25. The gear 22 is in mesh with a gear 26 mounted in the hub 27 of a bevel gear 28. The gear 28 is in mesh with the gears 29 of a planetary member 30 mounted at the end of a shaft 31. A bevel gear 32 is mounted at the other end of the shaft 31, and is in mesh with the gears 33 of a planetary member 34, which is mounted on the end of the shaft 6. The gear 25 is also in mesh with planetary gears 33.

With the above described arrangement of gearing, it is apparent that rotation of the shaft 16 by the motor 13, will cause the shafts 6 and 12 to be driven in unison, the speed of the shaft 6 being dependent upon the speed of rotation of the gears 25 and 32 which engage the gears 33 of the planetary member 34 on the shaft 6. The speed of rotation of the shaft 6 is adapted to be varied by changing the ratio between the gears 21 and 23, and 22 and 26, respectively, whereby the degree of turning movement of the mandrel 1 can be varied to regulate the angularity or steepness of the cut made by the tool 7 on the blank 5. The principle involved in transmitting the drive of the motor to the shaft 6 through the differential gearing, forms no part of the present invention, but is fully shown and described in my Patent No. 1,436,431, issued November 21, 1922, for a machine for planing gears.

The speed of rotation of the shaft 6, when driven through the differential action of the gears 25 and 32, is necessarily very slow, and in order to turn the mandrel 1 at an increased speed, when it is desired to index the blank 5, following the completion, as hereinafter described, of a single tooth by the tool 7, I have provided an indexing handle 35, carried on a stud 36, rotatably mounted in a bracket 37. A gear 38 is also mounted on the stud 36, and is in mesh with a gear 39 mounted on a shaft 40, which is provided at its other end with a gear 41 in mesh with the planetary gears 29. When the handle 35 is turned, with the motor shaft stationary, the rotation of the gear 41 with the shaft 40 causes the planetary members 30 and 34 to be driven directly through the shaft 31 and the gears 32 and 33. Consequently, the shaft 6 can be rotated to index the gear blank 5, at a relatively high speed, as compared to its speed of rotation when driven from the motor 13.

Figure 3:
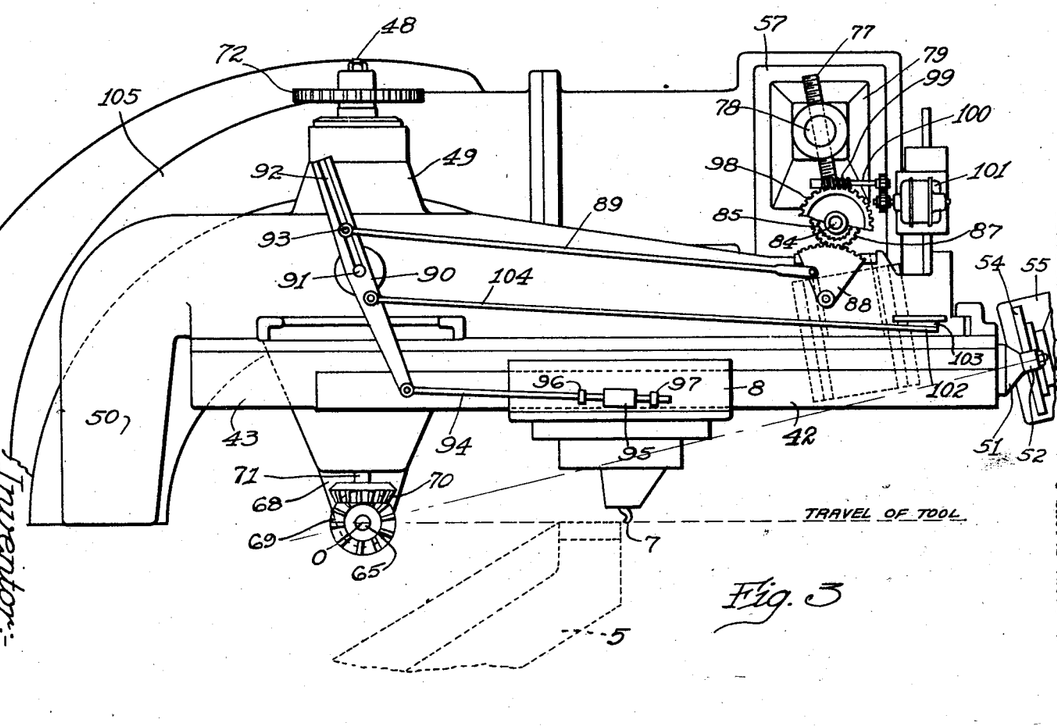
Fig. 3 is a plan view showing a portion of the parts of Fig. 1 on an enlarged scale.
Figure 4:
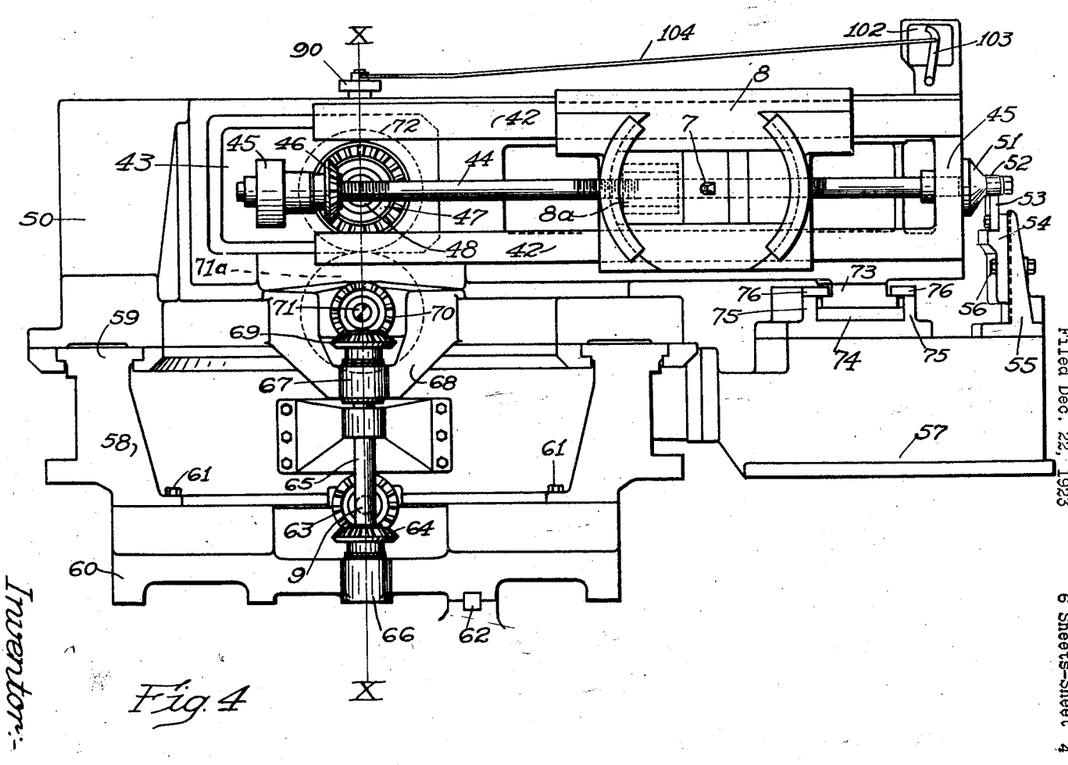
Fig. 4 is a view in front elevation of the parts shown in Fig. 3.

Referring now to Figs. 3, 4 and 8, the tool slide 8 is slidably mounted on a pair of rails 42 provided on a pivoted tool arm 43. A screw shaft 44 is rotatably supported between bearings 45, carried by the arm 43, and rotation of the shaft 44 is adapted to cause the tool slide 8 to be moved along the rails 42, by reason of its threaded engagement with a nut 8ª on the slide 8. The shaft 44 carries a bevel gear 46 in mesh with a bevel gear 47 mounted on a shaft 48, the latter, as shown in Fig. 8, extending at right angles to the shaft 44. The shaft 48 is rotatably supported in bearings provided by a trunnion 49, which in turn is rotatably supported in bearings 49ª, 49ª, provided by a tool bed 50. The trunnion 49 is provided with an enlarged head 49ᵇ, to which is secured the tool arm 43, so that the latter is adapted to be swung in a vertical plane about the common axis of the shaft 48 and the trunnion 49 by the action of a former mechanism, as will now be described. The free end of the tool arm 43 is provided with a boss 51, upon which is rotatably mounted a former roll 52, the axis of rotation of which passes through the cone center 0, as indicated in dot and dash lines in Fig. 3. The roll 52 rides on the surface of a cam 53 which is carried on a plate 54 adjustably secured on a pedestal 55 by bolts 56. The pedestal 55 is mounted on a swinging base 57, which will be hereinafter referred to.

As best shown in Figs. 1, 4 and 8, the swinging bed 50 is mounted on a turret 58, which is provided with a semicircular track portion 59. The turret 58 is in turn secured to a sliding base 60 by means of bolts 61, the base 60 resting on rails 62. The base 60, together with the turret 58 and the swinging bed 50 carrying the tool 7, is adapted to be shifted bodily on the rails 62 by mechanism which will be hereinafter described, for the purpose of positioning the tool 7 preparatory to operating on the gear blank 5.

The tool actuating shaft 9 extends into the base 60 and is provided at its end with a bevel gear 63 which is in mesh with a bevel gear 64 mounted on a vertical shaft 65 rotatably supported in a pedestal bearing 66 carried by the base 60. The shaft 65 is also rotatably supported in a sleeve bearing 67 carried by a downwardly projecting arm 68 of the swinging bed 50. The axis of rotation X—X of the shaft 65 passes through the cone center 0, so that it is obvious that the bed 50 is adapted to turn about the cone center 0 when moved on the circular track 59 of the turret 58 by the tool feeding mechanism.

The upper end of the shaft 65 is provided with a bevel gear 69, which is in mesh with a bevel gear 70 carried by a shaft 71 extending through the bed 50. The other end of the shaft 71 is provided with a spur gear 71ª, indicated in dotted lines in mesh with a gear 72 mounted on the shaft 48 which is connected to the screw shaft 44. From a consideration of the gearing just described, all of which is clearly shown in Figs. 4 and 8, it is apparent that rotation of the tool actuating shaft 9 will cause rotation of the screw shaft 44 through the shafts 65, 71 and 48 and the gearing associated therewith. Rotation of the screw shaft 44 will in turn cause movement of the tool slide 8 on the arm tool 43, the direction of rotation of the shaft 9 determining the direction of movement of the tool slide 8. It is also apparent that the movement of the tool slide 8 on the rails 42 may be accompanied by a pivotal movement of the tool arm 43 about the axis of the trunnion 49, by the former cam 53 and by a turning movement of the bed 50 about the cone center 0 by means of the tool feeding device, which will now be described.

As best shown in Fig. 4, the outer end of the swinging bed 50 is provided with a downwardly extending foot portion 73, the lower surface of which is smoothly finished and rests on a slide block 74. The block 74 is supported between guide members 75 which extend upwardly on either side of the foot portion 73, and are provided with inwardly extending flanges 76 which serve to confine the foot portion 73. The guide members 75 are spaced apart a distance greater than the width of the foot portion 73, so as to allow for the arcuate path of movement of the same when the bed 50 is swung about the cone center 0.

Figures 5, 6, 7:
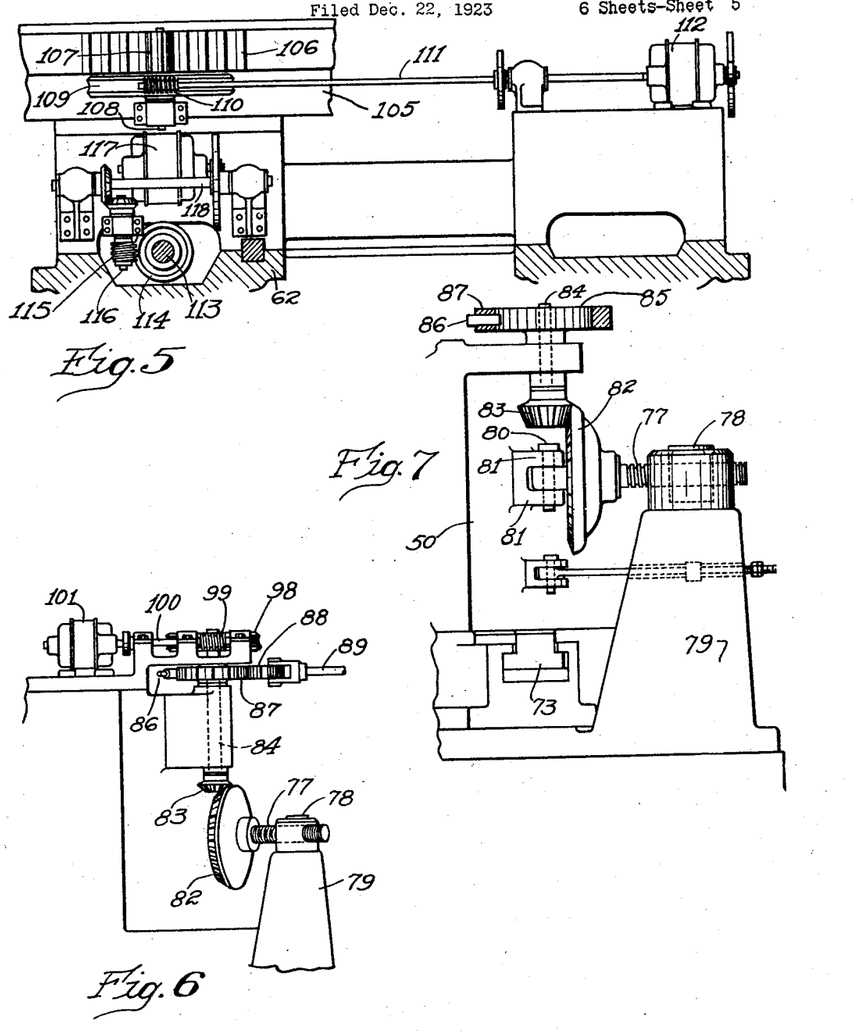
Fig. 5 is an enlarged sectional view along the line 5—5 of Fig. 1.
Fig. 6 is a fragmentary view, in end elevation, showing the details of the cross feed mechanism.
Fig. 7 is a view in front elevation of the parts shown in Fig. 6.

As best shown in Figs. 6 and 7, a cross feed shaft 77 is in threaded engagement with a pivot block 78 carried by a pedestal 79 extending upwardly from the base 57. The other end of the shaft 77 is pivotally supported on a pin 80 supported between arms 81 carried by the swing bed 50. The feed shaft 77 is provided with a bevel gear 82, which is in mesh with a bevel gear 83 mounted on a vertical shaft 84, rotatably carried by the bed 50. A ratchet wheel 85 is mounted on the shaft 84 and its teeth are adapted to be engaged by a pawl 86 extending through a toothed ring 87 rotatably mounted on the wheel 85, see Fig. 3. A toothed sector 88, see Fig. 1, engages the ring 87, and a driving rod 89 is pivotally connected at one end to the sector 88 and at its other end to a vibrating lever 90 pivotally mounted on a pin 91 carried by the bed 50. The lever 90 is provided with a slot 92, within which is received the pivot pin 93 of the rod 89, whereby the position of the pin 93 may be adjusted to vary the amplitude of the movement of the rod 89. A link 94 is pivotally connected to the other end of the lever 90, and the other end of the link 94 is received in a guide 95 mounted on the top of the tool slide 8. The link 94 is provided with stops 96 and 97, whereby the movement of the lever 90 is controlled.

From the above description of the arrangement of the cross feed screw and its driving connections, it is apparent that reciprocatory movement of the tool slide 8 will impart an oscillatory movement to the lever 90 which, in turn, will cause the pawl operating rod 89 to be moved back and forth to turn the pawl ring 87 first in one direction and then in the other. The teeth of the ratchet wheel 85 are so arranged that when the tool 7 is moved in the direction of the gear blank 5 on its cutting stroke, the pawl 86 will slide over the teeth, while upon the return movement of the tool 7, the pawl 86 will turn the wheel 85 and the shaft 84 an amount depending upon the amplitude of the movement of the rod 89. The turning of the shaft 84 will cause a rotative movement of the feed screw 77, and as the block 78 is fast on its pedestal 79, it is obvious that the bed 50 by reason of its connection to the screw 77 will be swung about the cone center 0 to move the tool in position for a fresh cut.

In order that the tool 7 may be moved away from the work rapidly after it has been fed by the screw 77 to the full depth of a tooth, I provide means for rotating the shaft 84 independently of the movement of the tool slide 8, this device being best shown in Fig. 6. A worm wheel 98 is mounted on the shaft 84 above the ratchet wheel 85 and is in mesh with a worm 99 carried on a shaft 100, which is connected to an electric motor 101 supported on a bracket carried by the bed 50. The operation of the motor 101 is adapted to rotate the shaft 84 free of the pawl 86 and thereby turn the feed shaft 77 in a direction of rotation opposite to that which it is turned when moving the swing bed 50 about the cone center to feed the tool. Obviously the turning of the feed shaft 77 by the motor 101 is much more rapid than the turning of the shaft 77 in the opposite direction when feeding the tool, so that by operating the motor 101, the tool 7 can be quickly withdrawn from the work following the completion of a tooth.

In order to reverse the direction of movement of the tool slide 8 at the end of each cutting stroke, a reversing switch 102 is mounted on a bracket extending upwardly from the bed 50, as best shown in Fig. 4, and is provided with an actuating arm 103 which is connected to a rod 104. The other end of the rod 104 is connected to the lever 90, so that as the lever 90 is oscillated by the reciprocatory movement of the tool slide 8, the switch arm 103 is moved from one extreme position to another. In one extreme position, the arm 103 connects the main driving motor 13 to its source of power, so that the tool operating slide 8 may be driven in such a direction of rotation as to cause the tool 7 to make a cutting stroke. This movement continues until the guide 95 engages the stop 96, whereupon the lever 90 is turned to cause the rod 104 to move the arm 103 to its other extreme position. In this position of the arm 103, the direction of rotation of the motor 13 of the shaft 9 is reversed, thereby causing the tool slide 8 to be so moved as to withdraw the tool 7 from the cut.

As best shown in Fig. 1, the pedestal base 57 extends from beneath the end of the bed 50 in the direction of the turret 58, and is provided with a curved portion 105 which is adapted to rest on a track provided on the turret 58 below the track portion 59 which supports the bed 50. As shown in Fig. 5, the curved portion 105 is provided on its outer periphery with a toothed sector 106, the teeth of which are in mesh with a pinion 107 provided on a vertical shaft 108. The shaft 108 is provided with a worm wheel 109 which is in mesh with a worm 110 carried on a shaft 111 extending across the base 60. The shaft 111 is adapted to be driven by an electric motor 112 mounted on a projection of the base 60. The operation of the motor 112 is adapted to swing the sector 106 on the turret 58. This movement causes the whole base 57 to be turned about the cone center, carrying the swinging bed 50 with it and, obviously, is only brought about when it is desired to approximately position the tool 7 prior to the commencement of cutting on a new blank 5, as will be hereinafter referred to.

As previously mentioned, the base 60 can also be shifted longitudinally for the purpose of bringing the axis of rotation X—X of the shaft 65 into exact alinement with the cone center of a new blank 5, prior to any other adjustments. For this purpose, a screw shaft 113 is rotatably supported between one pair of rails 62 and is in threaded engagement with a projecting portion of the base 60. A worm wheel 114 is mounted on the shaft 113 and is in mesh with a worm 115 mounted on a shaft 116. The shaft 116 is in turn driven by an electric motor 117 through a countershaft 118 and suitable gearing. By operation of the motor 117, the shaft 113 may be rotated, to cause the sliding base 60, together with the turret 58 and the swing bed 50, to be shifted bodily on the rails 62 to properly position the axis X—X of the shaft 65 with respect to a new cone center. When the base 60 is so shifted, the shaft 9 is adapted to move also and is provided with a sliding keyway 119 to permit it to be shifted with respect to the bevel gear 120, through which it is connected to the cross shaft 10.

Having thus described the various parts entering into my invention, the operation thereof and the details of my improved method will now be described. The gear blank 5, having been set up, the sliding base 60 is moved by means of the motor 117 to bring the axis X—X of the shaft 65 into exact alinement with the center or apex of the conical surface of the blank 5. The swinging base 57 is then moved by means of the motor 112 to bring the cutting tool 7 into line with the face of the gear blank 5, after which the base 57 is secured in position. The stops 96 and 97 are then adjusted to give the proper length of stroke for the tool to traverse the face of the gear blank 5. A cam 53, which is so formed as to give the proper contour to the cross section of the teeth about to be cut, is then placed in position, and the tool 7 is then ready for cutting. The degree of rotative movement of the gear blank which is necessary to cause the tool 7 to make a cut of the desired angularity, having been previously determined, it is then only necessary to place the proper change gears 21, 23, 22 and 26 on the shafts 6 and 18, respectively, to secure the desired rotative movement of the shaft 6 for a given speed of the tool shaft 12. The machine is then ready for operation and the motor 13 may be started. As the tool 7 makes its first cut on the blank 5, it is obvious that while the tool 7 travels in a straight line toward the cone center 0, the simultaneous angular movement of the blank 5 will cause the resulting cut to be in a curved path on the conical surface of the blank, which path will be a portion of a conical spiral of constant pitch. This is so, in view of the fact that a line traced on the surface of a cone and always moving toward the cone center or apex of a constant pitch, will be a true spiral.

When the tool 7 has reached the end of its stroke, the direction of rotation of the motor 13 is reversed by the operation of the switch arm 103, whereupon the tool slide 8 is moved in the opposite direction. When this occurs the ratchet wheel 85 is turned by the pawl 86 through a number of degrees determined by the length of the cutting stroke of the tool 7. This causes rotation of the shaft 84 which in turn turns the feed screw shaft 77, and thereby swings the tool bed 50 about the cone center 0 thus to feed the tool 8 toward the blank 5, so that on the next working stroke of said tool, it will cut deeper along the same conical spiral path previously made on the blank 5. As the bed 50 is thus swung about the cone center, the former cam 53 coacting with the roller 52, causes the tool arm 43 to be turned slightly about the axis of the trunnion 49, thereby positioning the tool in a vertical direction for the next cut. It is obvious that the resultant of these two movements in planes at right angles is to cause the tool 7, by successive cuts, each to a progressively greater depth, to cut a tooth with a face of the desired contour. The above described alternate cutting and feeding of the tool will continue so long as the motor 13 operates and until one side of the complete tooth has been formed. When the cutting on a particular tooth has been completed, by advancement of the tool 7 to the required depth the tool 7 may be quickly withdrawn from the cut by operating the motor 101, thereby turning the worm 99 and the shaft 84 in the opposite direction from which it is turned by the feed pawl.

The blank 5 may then be indexed for the start of a new tooth by turning the handle 35 to cause rotation of the shaft 40 and the gear 41. As the gear 28 is stationary at this moment, owing to the stoppage of the main motor 13, it is obvious that the planetary member 30 will be rotated directly by the gear 41 engaging the gears 29. The resulting rotation of the shaft 31 causes the gear 32 to turn the planetary member 34 directly, the gear 25 also remaining stationary. In this way the shaft 6 is moved directly by turning the indexing handle 35 at a relatively high rate of speed, as compared to its speed of rotation when rotated by the differential action of the gears 25 and 32. Consequently the gear blank 5 can be quickly moved to bring it into proper position for the beginning of a new tooth by the tool 7. The above described indexing operation is repeated after each single tooth has been cut to the required depth by successive strokes of the tool 7.

From the foregoing, it is apparent that by my invention I have provided an improved method and apparatus for carrying out the same, whereby gear teeth, each of the faces of which has the form of a conical spiral, can be cut on the surface of a conical blank. My method consists in causing the tool to always move in a straight line, although each time in a different path, toward the cone center, and at the same time in imparting a rotative movement to the blank about its own axis, which always passes through the cone center.

In order to properly carry out my method I have provided an improved machine in which all adjustments of the tool preparatory to cutting, and all vertical and horizontal movements of the tool necessary for feeding and for obtaining the desired contour of the tool are made with reference to the cone center. By my machine it is possible to cut true spiral teeth on conical blanks of many different sizes and diameters and with different angles to the conical surfaces, because of the great facility with which the entire tool mechanism, including the base 60, the tool bed 50 and the base 57 can be properly adjusted with reference to any fixed cone center.

While I have shown my invention as being carried out by a particular arrangement of parts, and as employing certain features shown and described in two United States Letters Patent mentioned above, it is to be understood that it is not so limited, and that certain modifications may be made without departing from the principle involved in my method and in the operation of the machine. I desire therefore that only such limitations be imposed thereon as may come within the scope of the appended claims.

I claim:

1. The improvement in the art of cutting spiral teeth on bevel gears, which consists in forming the face of each tooth with the desired contour by successive rectilinear movements in different paths imparted to a cutting tool, simultaneously with successive rotative movements imparted to a conical gear blank, with all of the tool cuts radiating from the cone center of the blank.

2. The improvement in the art of cutting spiral teeth on bevel gears, which consists in forming the face of each tooth with the desired contour by successive rectilinear movements in different paths imparted to a cutting tool, simultaneously with successive rotative movements imparted to a conical gear blank, while maintaining the conical gear blank in the line of center or apex of said blank in the line of movement of the cutting edge of said tool.

3. The improvement in the art of cutting spiral teeth on bevel gears, which consists in forming the face of each tooth with the desired contour by successive rectilinear movements imparted to a cutting tool, simultaneously with successive rotative movements imparted to a conical gear blank, and by successive advancements of said cutting tool toward said blank in the intervals between the successive rectilinear movements of said tool, whereby each tool cut is in a different path passing through the cone center of said blank.

4. In a machine of the class described, means for imparting successive back-and-forth oscillations to a conical gear blank, and means for imparting successive reciprocations to a cutting tool in different straight lines radiating from the cone center or apex of said blank, thereby, through successive cuts of said tool, to form the face of a spiral tooth on said gear blank, with the desired contour.

5. In a machine of the class described, means for imparting successive back-and-forth oscillations to a conical gear blank, means for imparting successive reciprocations to a cutting tool in straight lines radiating from the cone center or apex of said blank, and means controlled by the reciprocation of said tool for advancing said tool toward said blank in the intervals between successive cuts, whereby each tool cut is in a different path.

6. In a machine for cutting spiral teeth on a conical gear blank, the combination with means for imparting successive back-and-forth oscillations to said blank, of a cutting tool adapted to reciprocate in a line containing the cone center or axis of said blank, a pivotally mounted tool arm providing guides for the reciprocatory movement of said tool, and a forming device for procuring movement of said arm about its pivot, thereby to secure the successive movements of said tool along different lines radiating from said cone center.

7. In a machine for cutting spiral teeth on a conical gear blank, the combination with means for imparting successive back-and-forth oscillations to said blank, of a cutting tool adapted to reciprocate in a line containing the cone center or axis of said blank, a tool bed adapted to swing on a vertical axis passing through said cone center, and a tool arm providing guides for the movement of said tool and adapted to swing on a horizontal axis passing through said cone center.

8. In a machine for cutting spiral teeth on a conical gear blank, the combination with a rotating shaft for reciprocating a cutting device, a work carrier and a shaft for imparting successive back-and-forth oscillations to said work carrier, of a plurality of rotating elements driven from said rotating shaft by independent gearing, other gearing, operated upon in unison by all of said rotating elements, for transmitting the combined rotation thereof to said work carrier shaft, and means for rotating said work carrier shaft independently of said rotating elements.

9. In a machine for cutting spiral teeth on a conical gear blank, the combination with a rotating shaft for reciprocating a cutting device, a work carrier and a shaft for imparting successive back-and-forth oscillations to said work carrier, of a plurality of rotating elements driven from said rotating shaft by independent gearing, other gearing, operated upon in unison by all of said rotating elements, for transmitting the combined rotation thereof to said work carrier shaft, and means for rotating said work carrier shaft independently of said rotating elements for the purpose of indexing the work.

10. In a machine for cutting spiral teeth on a conical gear blank, the combination with a rotating shaft for reciprocating a cutting device, a work carrier and a shaft for imparting successive back-and-forth oscillations to said work carrier, of a plurality of sets of change gears driven from said rotating shaft, means for differentially transmitting the drive of said change gears to said work carrier shaft, and means for rotating said work carrier shaft independently of said change gearing.

11. In a machine for cutting spiral bevel gears, an angularly adjustable base, a vertical shaft passing through the center of angular adjustment of said base, a trunnion having a horizontal axis carried by said base, a shaft passing through the center of said trunnion, connections adapted to drive said second named shaft from said first named shaft, a tool slide supported by said trunnion, and tool driving means actuated from said second named shaft whereby to rectilinearly move a tool in adjustable paths, all of which converge at the point of intersection of the trunnion axis with said vertical shaft.

12. In a machine for cutting spiral bevel gears, an angularly adjustable base, a vertical shaft passing through the center of angular adjustment of said base, a trunnion having a horizontal axis carried by said base, a shaft passing through the center of said trunnion, connections adapted to drive said second named shaft from said first named shaft, a tool slide supported by said trunnion, and a screw shaft adapted to rectilinearly move said tool slide, said screw shaft being driven from said second named shaft, whereby to move said tool slide at a constant speed in adjustable paths, all of which converge at the point of intersection of the trunnion axis with said vertical shaft.

13. In a machine for cutting spiral bevel gears, the combination with an electric motor, work holding means and a driving connection between said parts, of an angularly adjustable base, a vertical shaft also driven from said electric motor and passing through the center of angular adjustment of said base, a tool slide supported from said base, connections including a screw shaft for rectilinearly moving said tool slide from said vertical shaft, and a reversing switch for said motor actuated by said tool slide whereby to simultaneously reverse the rectilinear movement of said tool slide and the rotative movement of said work holding means.

14. In a machine for cutting spiral bevel gears, the combination with an electric motor, work holding means and a driving connection between said parts, of an angularly adjustable base, a vertical shaft also driven from said electric motor and passing through the center of angular adjustment of said base, a tool slide angularly supported from said base, connections including a screw shaft for rectilinearly moving said tool slide from said vertical shaft, feeding means to angularly move said base, said feeding means being actuated by movement of said tool slide, and a reversing switch for said motor actuated by said tool slide whereby to simultaneously reverse the rectilinear movement of said tool slide and the rotative movement of said work holding means.

Dated this 17th day of December, 1923.

ELBERT H. CARROLL.